United States Patent
Yang et al.

(10) Patent No.: US 8,633,978 B2
(45) Date of Patent: Jan. 21, 2014

(54) HUMAN FACE DETECTION AND TRACKING DEVICE

(75) Inventors: Shu-Sian Yang, Hsinchu (TW); Ren-Hau Gu, Hsinchu (TW); Yi-Fang Lee, Hsinchu (TW); Ming-Tsan Kao, Hsinchu (TW); Teo-Chin Chiang, Hsinchu (TW); Chi-Chieh Liao, Hsinchu (TW); Wei-Ting Chan, Hsinchu (TW); Yu-Hao Huang, Hsinchu (TW); Wen-Han Yao, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 370 days.

(21) Appl. No.: 12/821,828

(22) Filed: Jun. 23, 2010

(65) Prior Publication Data

US 2010/0328442 A1    Dec. 30, 2010

Related U.S. Application Data

(60) Provisional application No. 61/220,559, filed on Jun. 25, 2009.

(51) Int. Cl.
*H04N 7/18* (2006.01)

(52) U.S. Cl.
USPC ...................... 348/77; 348/E7.085

(58) Field of Classification Search
USPC ........................................................... 348/77
See application file for complete search history.

(56) References Cited

U.S. PATENT DOCUMENTS

| | | | | |
|---|---|---|---|---|
| 2004/0264744 | A1* | 12/2004 | Zhang et al. | 382/118 |
| 2006/0280375 | A1* | 12/2006 | Dalton et al. | 382/275 |
| 2007/0031041 | A1* | 2/2007 | Ko et al. | 382/190 |
| 2008/0298637 | A1* | 12/2008 | Hu et al. | 382/103 |
| 2009/0141949 | A1* | 6/2009 | Lee et al. | 382/118 |
| 2009/0263022 | A1* | 10/2009 | Petrescu et al. | 382/195 |
| 2009/0303342 | A1* | 12/2009 | Corcoran et al. | 348/222.1 |

* cited by examiner

*Primary Examiner* — Dave Czekaj
*Assistant Examiner* — Nam Pham
(74) *Attorney, Agent, or Firm* — Moris Manning & Martin LLP; Tim Tingkang Xia, Esq.

(57) ABSTRACT

A human face detection device includes a photosensitive element, a human face detection unit, and a skin color threshold generation unit. The photosensitive element is used for capturing a first image containing a first human face block. The human face detection unit compares the first image with at least one human face feature, so as to detect the first human face block. The skin color threshold generation unit is used for updating a skin color threshold value according to the detected first human face block. The skin color threshold value is used for filtering the first image signal to obtain a candidate region, the human face detection unit compares the candidate region with the at least one human face feature to obtain the first human face block, and the skin color threshold value determines whether the first human face block detected by the human face detection unit is correct.

19 Claims, 9 Drawing Sheets

HUMAN FACE DETECTION AND TRACKING DEVICE

CROSS-REFERENCE TO RELATED APPLICATIONS

This non-provisional application claims priority under 35 U.S.C. §119(e) on Patent Application No(s). 61/220,559 filed in the United States on Jun. 25, 2009, the entire contents of which are hereby incorporated by reference.

BACKGROUND OF THE INVENTION

1. Field of the Invention

The present invention relates to a human face detection and tracking device, and more particularly to a human face detection and tracking device capable of generating an updated skin color threshold value.

2. Related Art

At present, image capturing devices have been widely applied in daily life. The image capturing device uses an optical sensor to capture an image, and converts the image into digital signals, and the digital signals can be stored. Through the digital signals captured by the image capturing device in combination with digital image processing technologies, various applications can be designed.

Among images captured by image capturing devices, portraits are the core. For example, currently, many image capturing devices are provided with human face detection and human face tracking technologies, which can assist in automatic multi-focusing of the shot region. In addition, the human face detection technology can be also used to determine whether a person is present in a particular region, for example, the human face detection technology can be applied to determine whether there is a user viewing a television screen in front of the television screen. When it is determined by using the human face detection technology that no person is in front of the television screen, the television screen may be automatically turned off, thereby achieving the effect of energy saving.

Human face detection is to determine whether an object being shot is a human face by analyzing and comparing visual feature information of the human face. However, in fact, the appearance of the human face is not steady, because people can make many facial expressions by controlling facial muscles. Besides, the human face looks quite different from different angles. In addition, human face detection is also susceptible to light conditions (for example, day and night, indoor and outdoor or special light), which increases the possibility of false determinations.

SUMMARY OF THE INVENTION

Accordingly, the present invention provides a human face detection device, so as to alleviate the difficulty in human face detection.

The human face detection device comprises a photosensitive element, a human face detection unit, and a skin color threshold generation unit. The photosensitive element is used for capturing a first image containing a first human face block. The human face detection unit is used for comparing the first image with at least one human face feature, so as to detect the first human face block. The skin color threshold generation unit is used for updating a skin color threshold value according to the detected first human face block. The skin color threshold value is used for filtering the first image signal to obtain a candidate region, the human face detection unit compares the candidate region with the at least one human face feature to obtain the first human face block, and/or the skin color threshold value is used for determining whether the first human face block detected by the human face detection unit is correct.

In addition, the present invention further provides a human face tracking device, which comprises a photosensitive element, a human face detection unit, a human face tracking unit, and a confidence value unit. The photosensitive element is used for capturing a first image containing a first human face block, and capturing a second image containing a second human face block. The second image is an image captured by the photosensitive element after capturing the first image. The human face detection unit is used for comparing the first image with at least one human face feature, so as to detect the first human face block. The human face tracking unit is used for dividing the second image into a plurality of image blocks, comparing the first human face block detected by the human face detection unit with the image blocks, and determining one of the image blocks as the second human face block. The confidence value unit is used for comparing the second human face block with the first human face block and/or the at least one human face feature, and adjusting a confidence value according to the comparison result. When the confidence value is smaller than a first threshold value, the second human face block is discarded.

Based on the above, the present invention can dynamically adjust the skin color threshold value for human faces, so as to accurately detect a human face in a special light environment. The present invention can also improve the accuracy of human face tracking by using the confidence value of the human face tracking region. In addition, the present invention can detect human faces of different sizes at the same time, and only requires a small amount of memory.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

Figure 1:
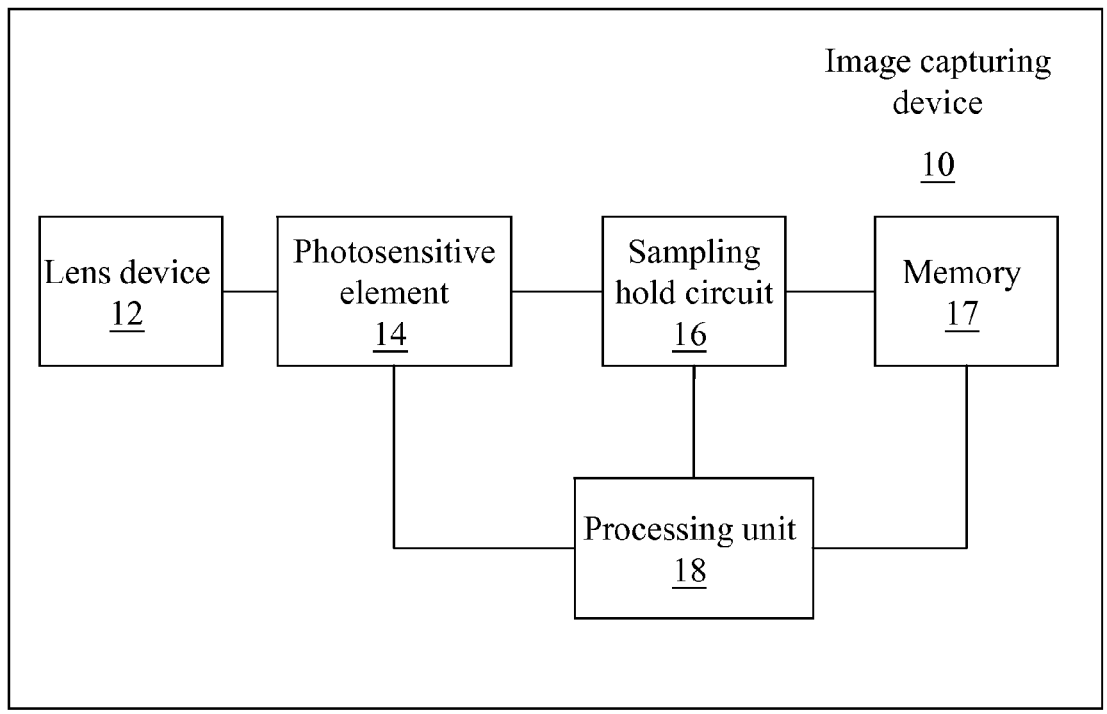
FIG. 1 is a schematic architectural view of a digital camera to which the present invention is applicable.

FIG. 1 is a schematic architectural view of a digital image capturing device to which the present invention is applicable. A digital camera to which the present invention is applicable may be, but is not limited to, the architecture shown in FIG. 1.

Referring to FIG. 1, an image capturing device 10 comprises a lens device 12, a photosensitive element 14, a sampling hold circuit 16, a memory 17, and a processing unit 18. Light reflected by a scene in front of the lens device 12 enters the photosensitive element 14 through the lens device 12, and after the photosensitive element 14 converts the light into a signal of an image and transmits the signal to the sampling hold circuit 16, the image may be recorded in the memory 17. The processing unit 18 may be a microprocessor, a microcontroller, an application-specific integrated circuit (ASIC), or a field programmable gate array (FPGA). The processing unit 18 not only can be used to control the photosensitive element 14, the sampling hold circuit 16, and the memory 17, but can also be used to implement a human face detection and tracking method of the present invention.

Figure 2A:
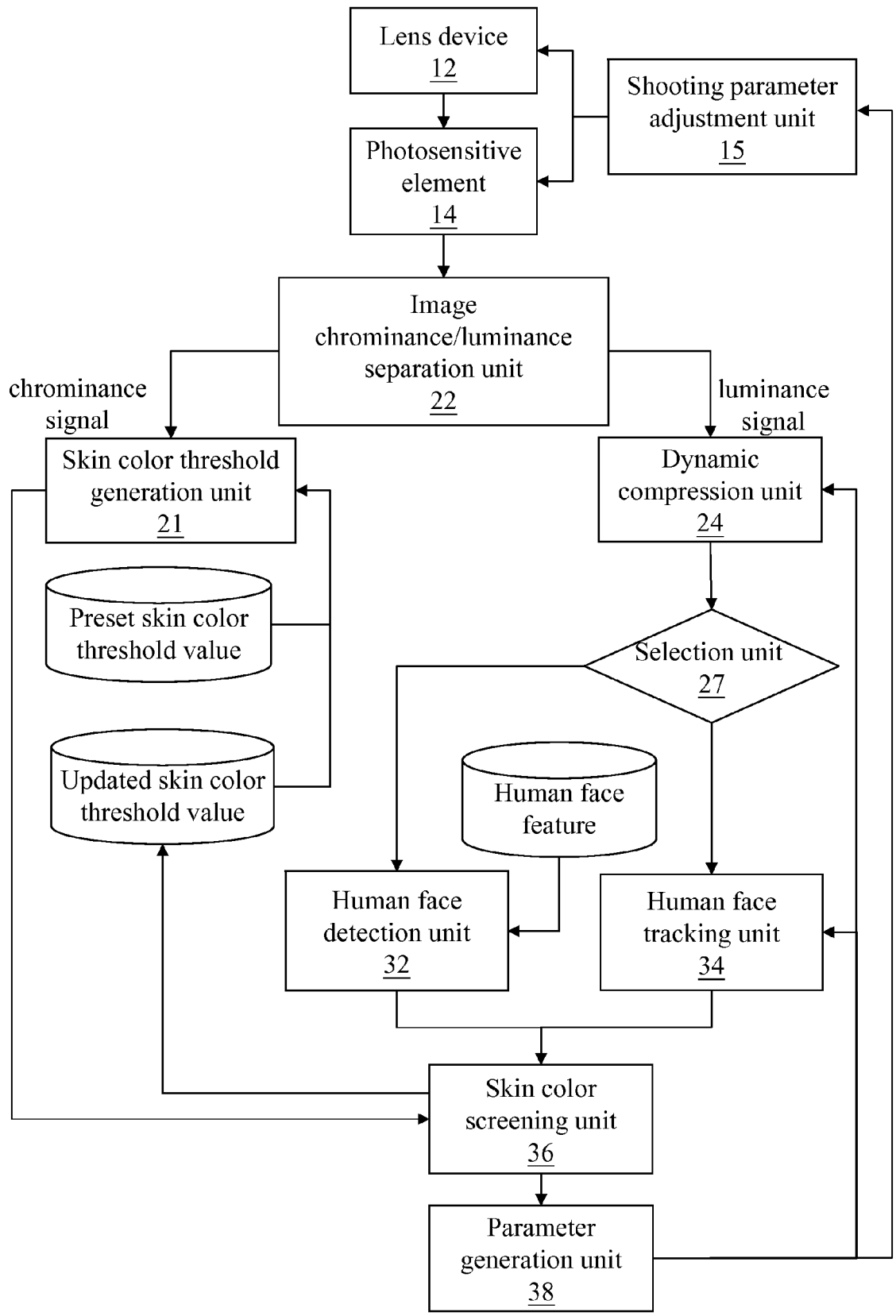
FIG. 2A is a system block diagram of a first embodiment of a human face detection and tracking device according to the present invention.
Figure 2B:
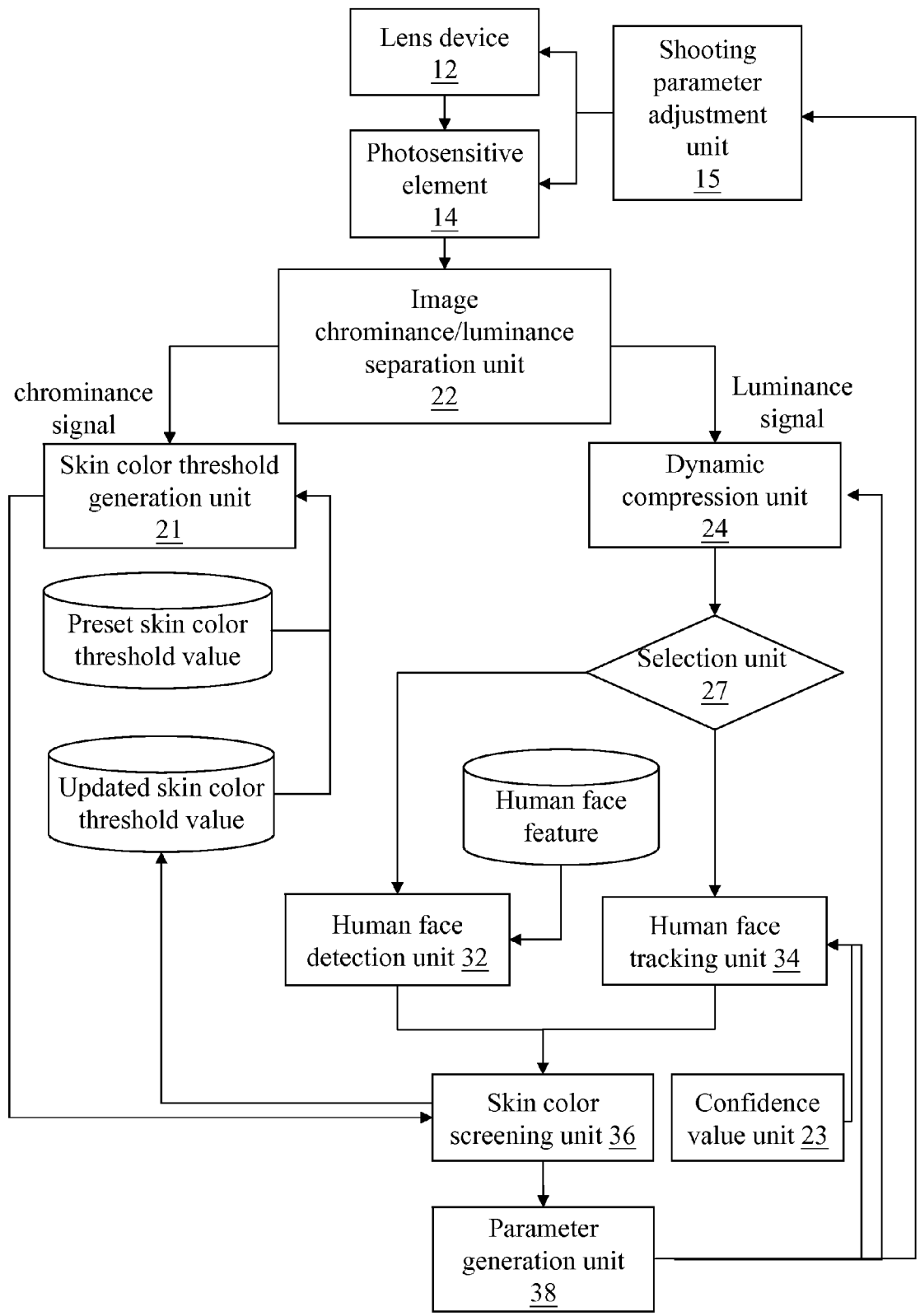
FIG. 2B is a system block diagram of a second embodiment of the human face detection and tracking device according to the present invention.

FIG. 2A is a system block diagram of a first embodiment of a human face detection device. Referring to FIG. 2B, the human face detection device comprises a photosensitive element 14, a human face detection unit 32, a human face tracking unit 34, and a skin color threshold generation unit 21.

The photosensitive element 14 is used for capturing a first image containing a first human face block.

The human face detection unit 32 is used for comparing the first image with at least one human face feature, so as to detect the first human face block.

The human face tracking unit 34 is used for dividing the second image into a plurality of image blocks, and selecting one of the image blocks most similar to the first human face block detected by the human face detection unit 32 as the second human face block. The second image is an image captured by the photosensitive element 14 after capturing the first image.

The skin color threshold generation unit 21 is used for updating a skin color threshold value according to the detected first human face block. The skin color threshold value is used for filtering the first image signal to obtain a candidate region, and/or the skin color threshold value is used for determining whether the first human face block detected by the human face detection unit 32 is correct.

An image signal is captured by the lens device 12 and the photosensitive element 14, and then an image chrominance/luminance separation unit 22 separates the image signal into a chrominance signal and a luminance signal.

A dynamic compression unit 24 performs image processing on the luminance signal, and the dynamic compression unit 24 may adjust excessively bright or dark portions to a moderate brightness, so as to increase the success ratio of detection or tracking. Then, a selection unit 27 is used to select whether to transmit the signal to the human face detection unit 32 or the human face tracking unit 34 at this time.

When the human face detection unit 32 determines that the image has a human face region, a skin color mask generation unit 26 generates an image mask according to the chrominance signal of the image signal, a preset skin color threshold value, and an updated skin color threshold value at this time, and transmits the image mask to a skin color screening unit 36. The skin color screening unit 36 determines a color value of the image according to the image mask, and further determines whether the image signal has a human face. If the skin color screening unit 36 determines that the image signal has a human face, the updated skin color threshold value is updated according to the color value at this time.

Finally, a parameter generation unit 38 generates a plurality of parameters according to the detected human face region. The parameters are fed back to a shooting parameter adjustment unit 15, the dynamic compression unit 24, and the human face tracking unit 34, so as to dynamically adjust the step of image capturing or human face detection and tracking.

In the system block diagram, the chrominance/luminance separation unit 22, the dynamic compression unit 24, the skin color mask generation unit 26, the selection unit 27, the human face detection unit 32, the human face tracking unit 34, the skin color screening unit 36, and the parameter generation unit 38 may be accomplished by a program code or circuit. The program code may be executed by a microprocessor or microcontroller. The circuit may be integrated into one or more integrated circuits, or accomplished by an FPGA.

FIG. 2B is a system block diagram of a second embodiment of the human face detection device. Referring to FIG. 2B, the human face detection device comprises the photosensitive element 14, the human face detection unit 32, the human face tracking unit 34, the skin color threshold generation unit 21, and a confidence value unit 23.

The confidence value unit 23 is used for comparing the second human face block with the first human face block and/or the at least one human face feature, and adjusting a confidence value according to the comparison result. When the confidence value is smaller than a first threshold value, the second human face block is discarded.

Figure 2C:
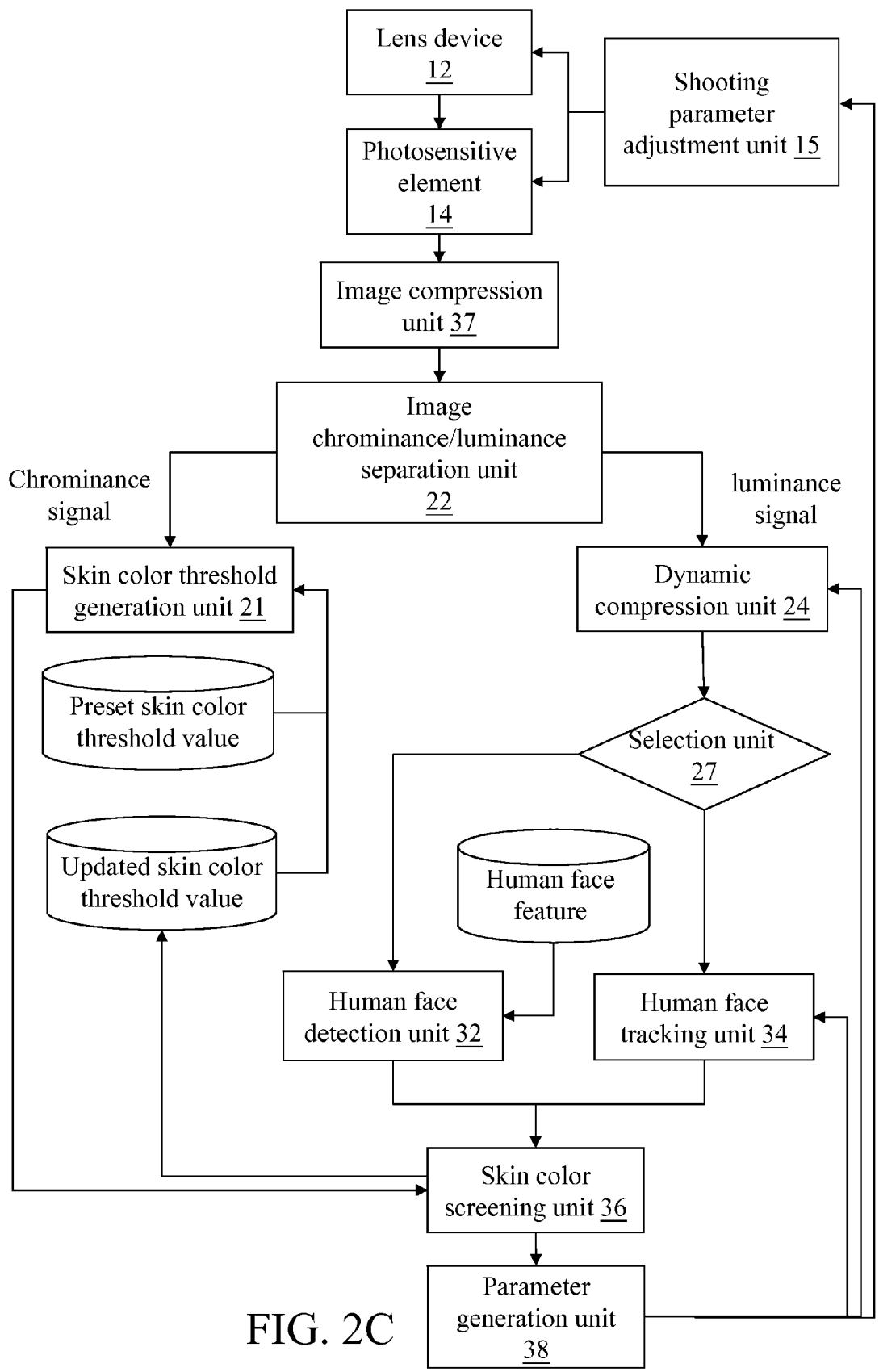
FIG. 2C is a system block diagram of a third embodiment of the human face detection and tracking device according to the present invention.

FIG. 2C is a system block diagram of a third embodiment of the human face detection device. Referring to FIG. 2C, the human face detection device comprises the photosensitive element 14, the human face detection unit 32, the human face tracking unit 34, the skin color threshold generation unit 21, and an image compression unit 37.

The image compression unit 37 is used for down-sampling a plurality of sub-images with different resolutions from the first image, and compressing the sub-images. The human face detection unit 32 selects and decodes one sub-image of the sub-images, and then detects the first human face block in the selected and decoded sub-image.

The above description describes the system architecture of the present invention, and the method performed according to the system architecture is described below.

Figure 3:
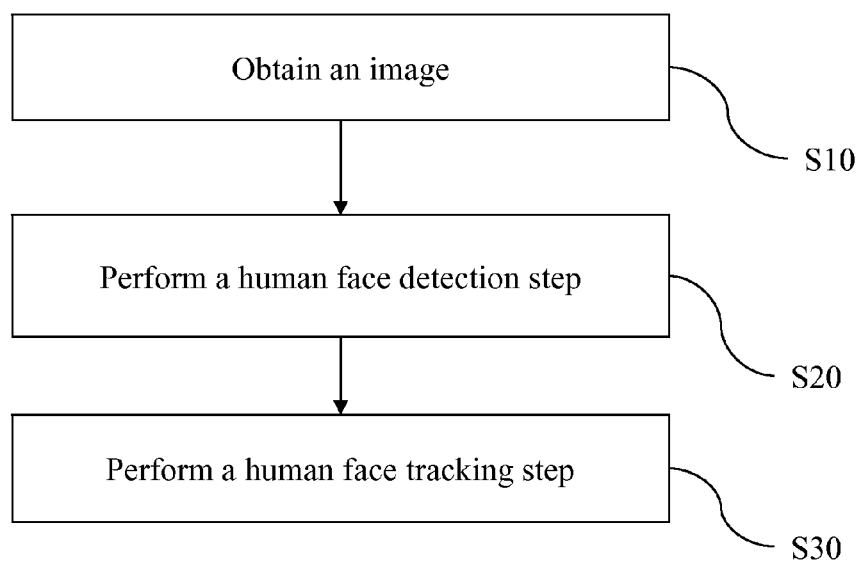
FIG. 3 is a flow chart of a first embodiment of a human face detection and tracking method according to the present invention.

FIG. 3 shows a first embodiment of the human face detection and tracking method. Referring to FIG. 3, the human face detection and tracking method comprises: obtaining an image (S10), performing a human face detection step (S20), and performing a human face tracking step (S30).

In Step S10, an image is obtained, that is, an image is captured by the image capturing device 10. Within a period of time, the image capturing device 10 may continuously capture a plurality of images for combination into a dynamic image.

After the image is obtained, a human face detection step, that is Step S20, is performed. This step may be performed by the human face detection unit 32. The human face detection step is used for detecting whether the image has a human face. If no human face is detected, Step S20 is repeated. If it is detected that the image has at least one human face, Step S30 is performed, that is, a human face tracking step is performed. The human face tracking step (S30) may be continuously performed for multiple times, and after the number of times reaches a preset number, the human face detection step (S20) is performed again.

The human face tracking step (S30) is based on the human face detected in the human face detection step (S20), and may be performed by the human face tracking unit 34. Since the human face does not experience jumpy movement, the number of times of human face detection can be reduced by tracking, thereby lowering the computational complexity.

Detailed steps of the human face detection step (S20) and the human face tracking step (S30) will be described in detail later.

Figure 4:
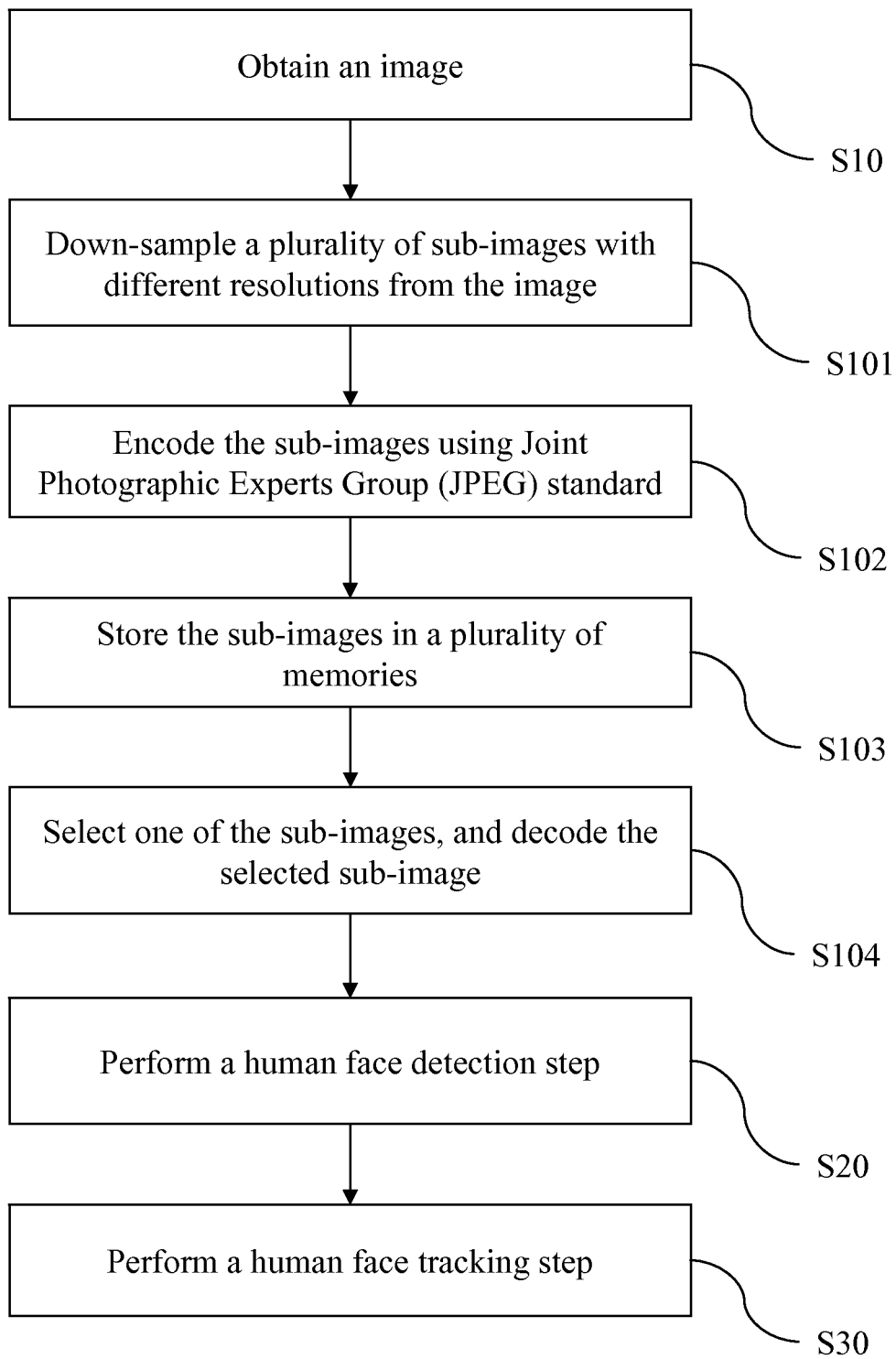
FIG. 4 is a flow chart of a second embodiment of the human face detection and tracking method according to the present invention.

FIG. 4 shows a second embodiment of the human face detection and tracking method. Referring to FIG. 4, the method comprises: obtaining an image (S10); down-sampling a plurality of sub-images with different resolutions from the image (S101); encoding the sub-images using Joint Photographic Experts Group (JPEG) standard (S102); storing the sub-images in a plurality of memories (S103); selecting one of the sub-images, and decoding the selected sub-image (S104); performing a human face detection step (S20); and performing a human face tracking step (S30).

In order to enable this method to detect human faces of different sizes, after the captured image is down-sampled, it is detected whether a frame has a human face according to a human face feature of a preset size (generally 24×24 pixels). In Step S101, a plurality of sub-images with different resolutions is down-sampled from the obtained image. For example, the original resolution of the obtained image is 320×240 pixels. In this step, the obtained image may be down-sampled to frames with resolutions of 160×120 pixels, 80×60 pixels and 40×30 pixels.

Afterward, in Step S102, the sub-images with different resolutions are encoded using JPEG standard.

After compression, a JPEG file obtained by compression is stored in the memory, that is, Step S103 is performed. At this time, the required storage capacity of the memory can be greatly reduced.

In Step S104, before human face detection is performed, one of the sub-images is selected, and the selected sub-image is decoded. Afterward, a human face detection step (S20) and a human face tracking step (S30) are performed by using the decoded sub-image.

Figure 5:
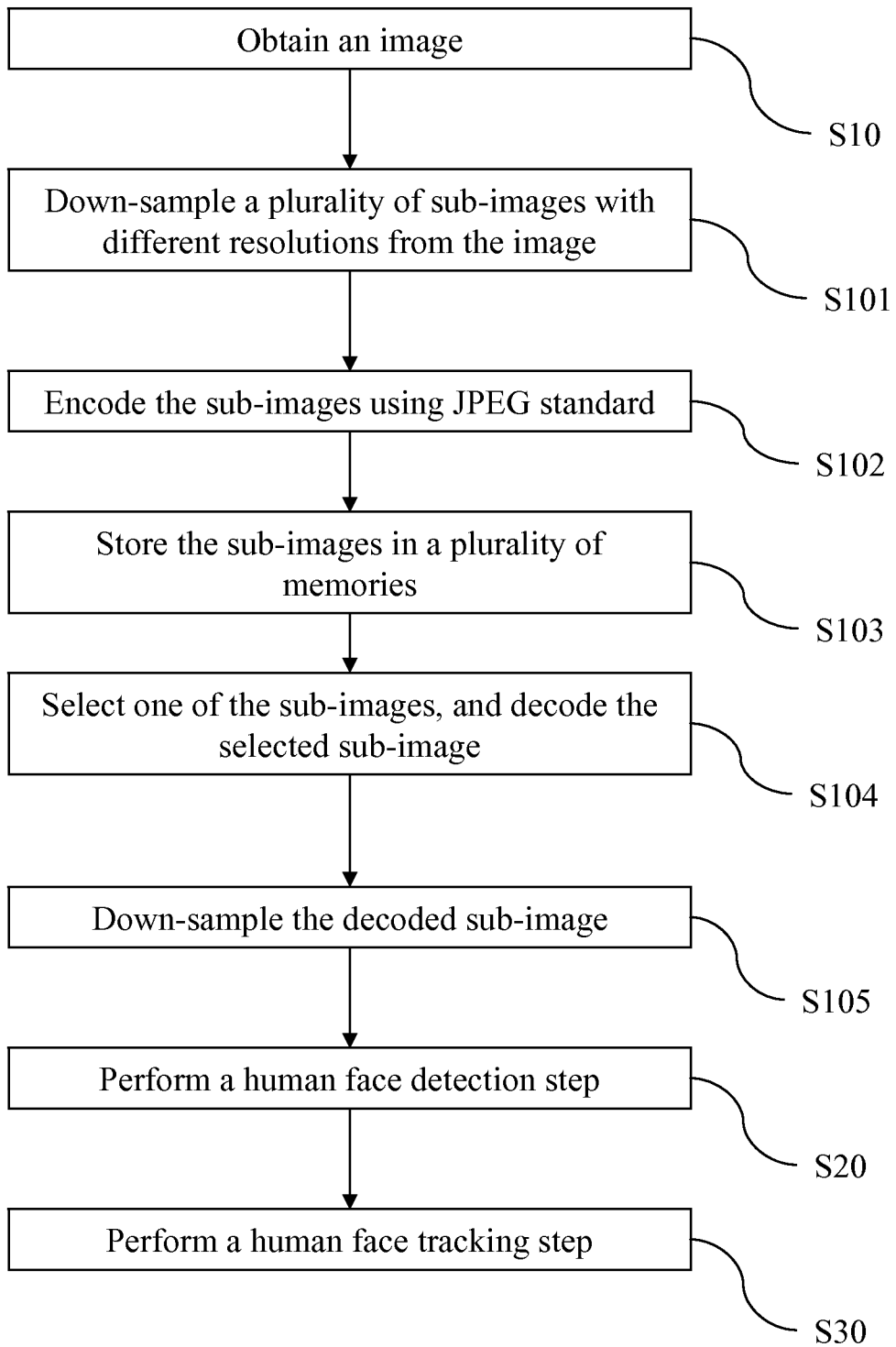
FIG. 5 is a flow chart of a third embodiment of the human face detection and tracking method according to the present invention.

FIG. 5 shows a third embodiment of the human face detection and tracking method. Referring to FIG. 5, the method comprises: obtaining an image (S10); down-sampling a plurality of sub-images with different resolutions from the image (S101); encoding the sub-images using JPEG standard (S102); storing the sub-images in a plurality of memories (S103); selecting one of the sub-images, and decoding the selected sub-image (S104); down-sampling the decoded sub-image (S105); performing a human face detection step (S20); and performing a human face tracking step (S30).

In the second embodiment, human face detection can only be performed on the images with different resolutions stored in the memories. In order to detect more human faces with different resolutions, after Step S104, the decoded sub-image is further down-sampled, that is, Step S105 is performed. For example, an image with a resolution of 160×120 pixels is down-sampled to an image with a resolution of 120×90 pixels, and then the image with the resolution of 120×90 pixels is compared in terms of human face features. Alternatively, an image with a resolution of 80×60 pixels is down-sampled to an image with a resolution of 60×45 pixels. Therefore, the method can perform human face detection on human faces of different sizes.

Figure 6:
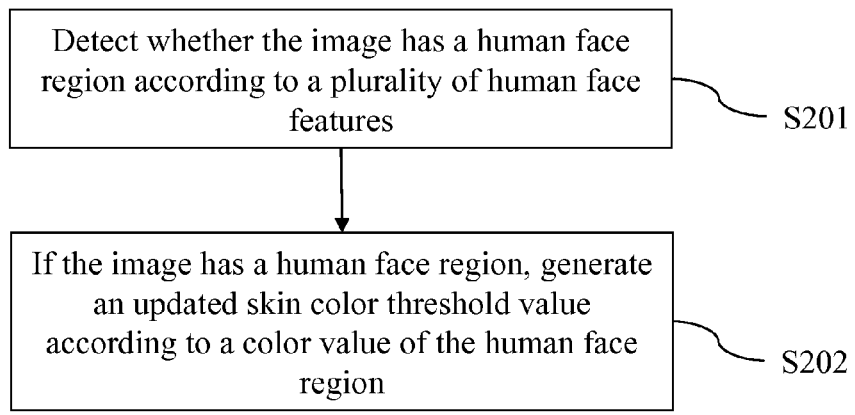
FIG. 6 is a flow chart of a human face detection step according to the present invention.

FIG. 6 is a flow chart of a human face detection step. Referring to FIG. 6, the human face detection step S20 comprises: detecting whether the image has a human face region according to a plurality of human face features (S201); and if the image has a human face region, generating an updated skin color threshold value according to a color value of the human face region (S202).

In Step S201, the human face features are regions having features on an ordinary human face, such as eyes, eyebrow, nose and mouth. When the image is detected, information about a gradient between the features is found by using the features, and the gradient information is used as the basis for detection. In addition, features such as the profile and shape of the human face may also be used as the basis for detection. Hundreds or thousands of human face features may exist, and after the image is filtered by using the hundreds or thousands of human face features, a region having all the features is a human face region.

In order to reduce the capacity of the memory 17 required for storing the human face features, the human face features may be compressed before storage. In this embodiment, a compression method called vector quantization is used for compressing the human face features. In the vector quantization method, each of the human face features is converted into a codeword through table look-up. Bit numbers of the codewords are far smaller than those of the human face features. Therefore, since only the codewords need to be stored in the memory 17, the capacity of the memory 17 required for storing the human face features can be greatly reduced. The above codewords may be generated according to the Linde-Buzo-Gray method. When human face detection is performed by using the codewords generating by this method, the error rate of detection is close to that when no compression is performed. Therefore, by compressing the human face features using vector quantization, the capacity of the memory 17 occupied by storing the human face features can be greatly reduced without greatly affecting the accuracy of human face detection.

In Step S202, an updated skin color threshold value is dynamically generated according to color values of the determined human face regions. The color presented on the human face may vary greatly with special occasions. For example, when an intense blue light is projected onto the human face, the human face presents a slightly blue appearance. If an ordinary skin color is further used as a screening mechanism after filtering according to the human face features, it may be determined that the slightly blue human face is not a human face, resulting in a false determination. In addition, since the human face features (for example, the gradient between the features or the profile) do not vary when the color changes, in the present invention, a new updated skin color threshold value is generated according to the result of determination according to the human face features, so as to reflect the actual color presented on the human face at the time. The newly generated updated skin color threshold value can not only be used as a screening mechanism in the human face detection step S20, but can also be used as a reference for determination during tracking in the human face tracking step S30.

Figure 7:
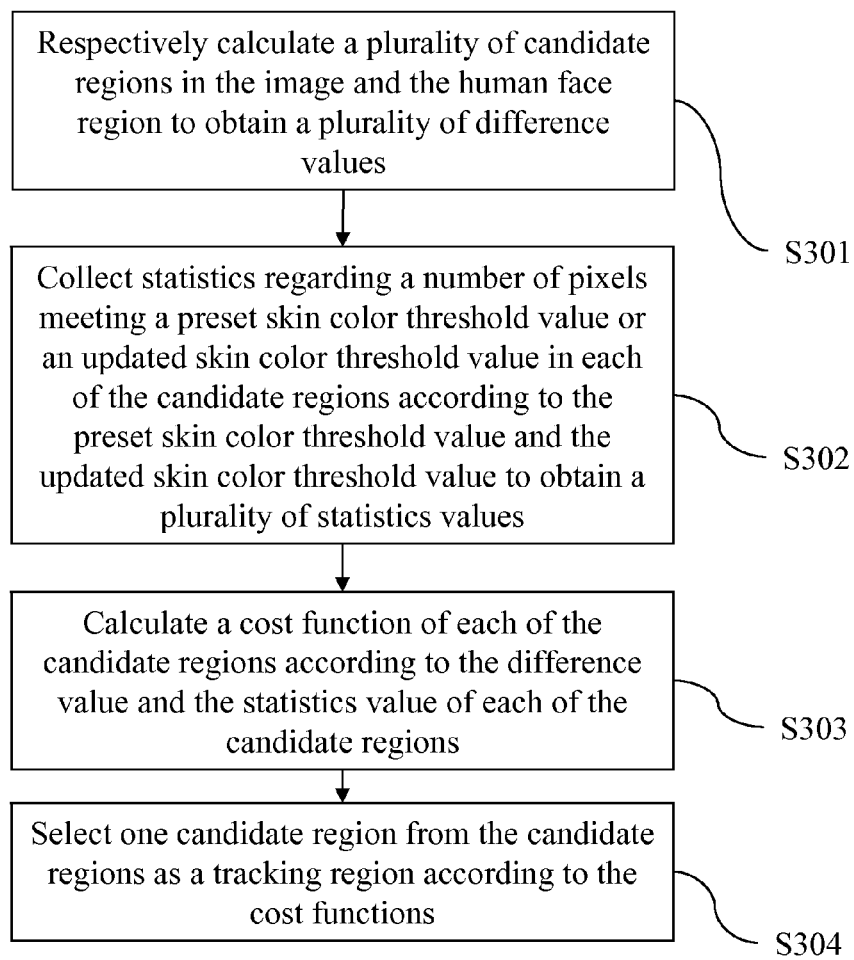
FIG. 7 is a flow chart of a human face tracking step according to the present invention.

FIG. 7 is a flow chart of a human face tracking step. Referring to FIG. 7, the human face tracking step S30 comprises:

respectively calculating a plurality of candidate regions in the image and the human face region to obtain a plurality of difference values (S301); collecting statistics regarding a number of pixels meeting a preset skin color threshold value or an updated skin color threshold value in each of the candidate regions according to the preset skin color threshold value and the updated skin color threshold value to obtain a plurality of statistics values (S302); calculating a cost function of each of the candidate regions according to the difference value and the statistics value of each of the candidate regions (S303); and selecting one candidate region from the candidate regions as a tracking region according to the cost functions (S304).

In Step S301, the candidate regions are of the same size as the human face region. The candidate regions may be located at any positions in the image, or located at positions around the human face region. If any position in the image is a candidate region, every position in the image is tracked in the method. However, the larger the number of candidate positions is, the more computations are required by the method. In addition, since the movement of the human face is continuous, the different between the positions of the human face in two consecutive images is quite small. Therefore, in fact, only the positions around the human face region need to be listed as candidate regions for tracking the target, thereby saving a large amount of computations.

After a plurality of candidate regions is selected, difference values between the candidate regions and the human face region are calculated, and a difference value is defined for each candidate region. The difference value between each candidate region and the human face region is calculated based on corresponding points in the two regions. In a calculation method, Red Green Blue (RGB) color values or Luminance Chrominance Chroma (YCbCr) or gray-level values of each two regions are subtracted from each other. Afterward, absolute values of results obtained after subtraction are calculated and summed, or squares of results obtained after subtraction are calculated and summed.

In the present invention, in addition to the use of the difference value as a criterion for tracking, the updated skin color threshold value generated in the human face detection step S20 may be further used as a screening mechanism. In Step S302, statistics regarding the total number of pixels meeting the preset skin color threshold value or the updated skin color threshold value in each of the candidate regions are collected respectively. For each candidate region, a statistics value is calculated according to the above method. The preset skin color threshold value is a skin color value of an ordinary person under ordinary light, and the updated skin color threshold value is a skin color value presented under a light value of the human face detection step.

Afterward, in Step S303, a cost function of each of the candidate regions is calculated according to the difference value and the statistics value of each of the candidate regions. The cost function is correlated to the difference value and the statistics value. The higher the difference value is, the higher the cost function will be. The higher the statistics value is, the lower the cost function will be.

Finally, in Step S304, the candidate region having the lowest cost function among the candidate regions is selected as the tracking region according to the cost function of each candidate region. The tracking region represents a current position of the human face.

Therefore, the method can accurately detect and track the human face under current light conditions.

Figure 8:
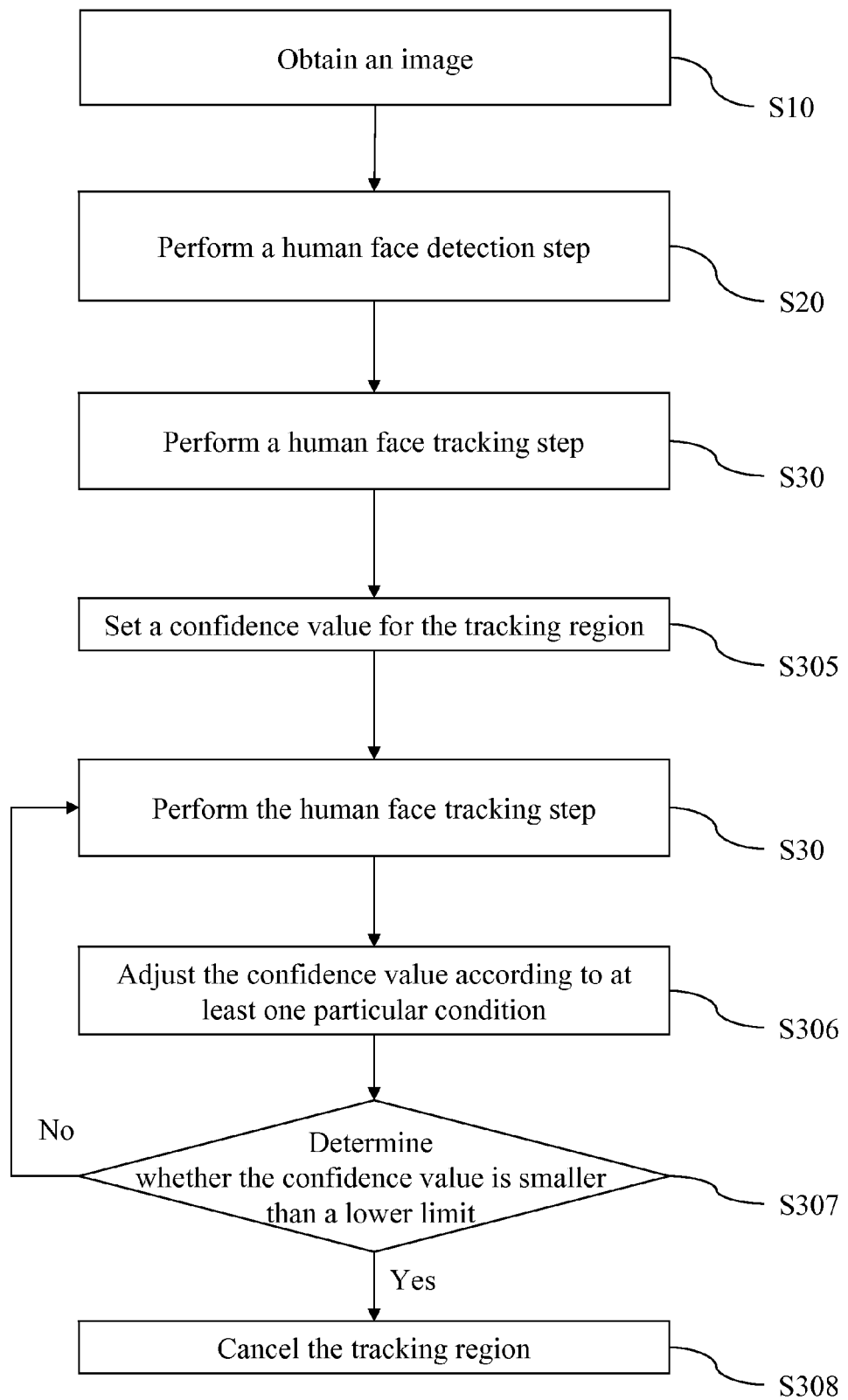
FIG. 8 is a flow chart of a fourth embodiment of the human face detection and tracking method according to the present invention.

Besides the above description, the following variations may further be made to the human face detection and tracking method of the present invention. FIG. 8 is a flow chart of a fourth embodiment of the human face detection and tracking method. Referring to FIG. 8, the human face detection and tracking method comprises: obtaining an image (S10); performing a human face detection step (S20); performing a human face tracking step (S30); setting a confidence value for the tracking region (S305); performing the human face tracking step (S30); adjusting the confidence value according to at least one particular condition (S306); determining whether the confidence value is smaller than a lower limit (S307); and canceling the tracking region (S308).

Steps S10, S20 and S30 are the same as those in the above embodiments, so the details will not be described herein again. In Step S305, the confidence value may be determined depending on the number of the human face features present in the human face region, and/or the cost function.

Then, in Step S306, the confidence value is adjusted according to at least one particular condition. In detail, when the position of the tracking region remains unchanged, or when the tracking region is located around the image, the confidence value is lowered. On the other hand, when the cost function is lower than a preset reference value, the confidence value is increased.

In addition, it can be seen from the above description that each time the human face tracking step has been performed for multiple times, the human face detection step is performed once. At this time, the human face detection step can be used to adjust the confidence value.

After the confidence value is adjusted, it is determined whether the confidence value is smaller than a lower limit, that is, Step S307 is performed. When the confidence value is smaller than the lower limit, it indicates that the human face probably has moved out of the image, and at this time, the selected tracking region is cancelled, that is, Step S308 is performed.

On the other hand, if the confidence value is larger than an upper limit, it indicates that the tracking region is very probably a human face in fact, and at this time, the confidence value is otherwise adjusted.

Based on the above, the present invention can dynamically adjust the skin color threshold value for human faces, so as to accurately detect a human face in a special light environment. The present invention can also improve the accuracy of human face tracking by using the confidence value of the human face tracking region. In addition, the present invention can detect human faces of different sizes at the same time, and only requires a small amount of memory.

What is claimed is:
1. A human face detection device, comprising:
a photosensitive element, for capturing a first image containing a first human face block;
a human face detection unit, for comparing the first image with at least one human face feature, so as to detect the first human face block; and
a skin color threshold generation unit, for updating a skin color threshold value according to color of the detected first human face block;
wherein the skin color threshold value is used for filtering the first image to obtain a candidate region, the human face detection unit compares the candidate region with the at least one human face feature to obtain the first human face block, the skin color threshold generation unit generates an updated skin color threshold value according to a color value of a human face region when the first image has the human face region, and the skin color threshold value is used for determining whether the first human face block detected by the human face detection unit is correct.

2. The human face detection device according to claim 1, further comprising a human face tracking unit, for tracking a second human face block in a second image according to the first human face block detected by the human face detection unit, wherein the second image is an image captured by the photosensitive element after capturing the first image.

3. The human face detection device according to claim 2, wherein the human face tracking unit divides the second image into a plurality of image blocks, and selects one of the image blocks most similar to the first human face block as the second human face block.

4. The human face detection device according to claim 2, wherein the human face tracking unit further tracks the second human face block in the second image by using the skin color threshold value.

5. The human face detection device according to claim 2, wherein the human face tracking unit further determines whether the second human face block is correct according to a number of pixels larger than the skin color threshold value in the second human face block.

6. The human face detection device according to claim 1, further comprising an image compression unit, for down-sampling a plurality of sub-images with different resolutions from the first image, and compressing the sub-images, wherein the human face detection unit selects and decodes one sub-image of the sub-images, and then detects the first human face block in the selected and decoded sub-image.

7. The human face detection device according to claim 6, wherein the sub-image is compressed and decoded through a Joint Photographic Experts Group (JPEG) technology.

8. The human face detection device according to claim 1, wherein the at least one human face feature is a vector-quantized codeword, and the codeword is stored in a memory.

9. A human face tracking device, comprising:
a photosensitive element, for capturing a first image containing a first human face block, and capturing a second image containing a second human face block, wherein the second image is an image captured by the photosensitive element after the first image is captured;
a human face detection unit, for comparing the first image with at least one human face feature, so as to detect the first human face block;
a human face tracking unit, for dividing the second image into a plurality of image blocks, comparing the first human face block detected by the human face detection unit with the image blocks, and determining one of the image blocks as the second human face block; and
a confidence value unit, for comparing the second human face block with the first human face block and/or the at least one human face feature, and adjusting a confidence value according to a comparison result between the second human face block and the first human face block, wherein when the confidence value is smaller than a first threshold value, the second human face block is discarded.

10. The human face tracking device according to claim 9, wherein the at least one human face feature comprises a skin color threshold value, and the confidence value unit compares the second human face block with the skin color threshold value, and when a portion of pixels lower than the skin color threshold value in the second human face block is greater than a second threshold value, the confidence value unit lowers the confidence value.

11. The human face tracking device according to claim 9, wherein the confidence value unit compares the second human face block with the first human face block, and when a distance between the second human face block and the first human face block exceeds a second threshold value, the confidence value unit lowers the confidence value.

12. The human face tracking device according to claim 9, wherein the confidence value unit further compares the second human face block with the second image, and when the second human face block moves to an edge of the second image, the confidence value unit lowers the confidence value.

13. The human face tracking device according to claim 9, wherein the confidence value unit compares the second human face block with the first human face block, and when positions of the second human face block and the first human face block are overlapped, the confidence value unit lowers the confidence value.

14. The human face tracking device according to claim 9, further comprising an image compression unit, for down-sampling a plurality of sub-images with different resolutions from the first image, and compressing the sub-images, wherein the human face detection unit selects and decodes one sub-image of the sub-images, and then detects the first human face block in the selected and decoded sub-image.

15. The human face tracking device according to claim 14, wherein the sub-image is compressed and decoded through a Joint Photographic Experts Group (JPEG) technology.

16. The human face tracking device according to claim 9, wherein the at least one human face feature is a vector-quantized codeword.

17. The human face tracking device according to claim 9, wherein the human face tracking unit respectively calculates the image blocks in the second image and the first human face block to obtain a plurality of difference values, collects statistics regarding a number of pixels meeting the skin color threshold value in each of the image blocks to obtain a plurality of statistics values, calculates a cost function of each of the image blocks according to the difference value and the statistics value of each of the image blocks, and selects one image block from the image blocks as the second human face block according to the cost functions, wherein the cost function is positively correlated to the difference value, and the cost function is negatively correlated to the statistics value.

18. The human face tracking device according to claim 17, wherein a gray-level value or a color value of the first human face block is subtracted from the image blocks in the second image respectively, and absolute values of results obtained after subtraction are calculated and summed, so as to obtain the difference value.

19. The human face tracking device according to claim 17, wherein a gray-level value or a color value of the first human face block is subtracted from the image blocks in the second image respectively, and squares of results obtained after subtraction are calculated and summed, so as to obtain the difference value.

* * * * *